United States Patent
Clausi et al.

(10) Patent No.: US 12,390,831 B2
(45) Date of Patent: Aug. 19, 2025

(54) PRESSABLE COATING SYSTEM FOR THE PRODUCTION OF PANEL PRODUCTS

(71) Applicants: Robert N. Clausi, Oakville (CA); Salvatore A. Diloreto, Ancaster (CA)

(72) Inventors: Robert N. Clausi, Oakville (CA); Salvatore A. Diloreto, Ancaster (CA)

(73) Assignee: PurChem Systems, Inc., Ontario (CA)

( * ) Notice: Subject to any disclaimer, the term of this patent is extended or adjusted under 35 U.S.C. 154(b) by 0 days.

(21) Appl. No.: 16/497,857

(22) PCT Filed: Mar. 26, 2018

(86) PCT No.: PCT/CA2018/050363
§ 371 (c)(1),
(2) Date: Sep. 26, 2019

(87) PCT Pub. No.: WO2018/176130
PCT Pub. Date: Oct. 4, 2018

(65) Prior Publication Data
US 2020/0030846 A1    Jan. 30, 2020

Related U.S. Application Data

(60) Provisional application No. 62/477,115, filed on Mar. 27, 2017.

(51) Int. Cl.
*B05D 3/02*   (2006.01)
*B05D 3/12*   (2006.01)
(Continued)

(52) U.S. Cl.
CPC ............. *B05D 3/0254* (2013.01); *B05D 3/12* (2013.01); *B05D 5/06* (2013.01); *B29C 41/00* (2013.01); *B32B 27/00* (2013.01); *B32B 2319/00* (2013.01)

(58) Field of Classification Search
CPC .............................. B32B 27/00; C09D 175/04
See application file for complete search history.

(56) References Cited

U.S. PATENT DOCUMENTS

2005/0089644 A1* 4/2005 Oldorff ................... B05D 7/06
427/393
2009/0239027 A1   9/2009 Oldorff
(Continued)

FOREIGN PATENT DOCUMENTS

| CA | 2751164 | 8/2010 |
|---|---|---|
| CA | 2739124 | 6/2011 |
| WO | 2018/045466 | 3/2018 |

OTHER PUBLICATIONS

International Search Report issued in PCT/CA2018/050363, Jun. 12, 2018, pp. 1-2.
(Continued)

*Primary Examiner* — Ian A Rummel
(74) *Attorney, Agent, or Firm* — Olive Law Group, PLLC

(57) ABSTRACT

A panel and a panel production method are provided wherein an elastomeric coating, and preferably, a water-based elastomeric polyurethane coating, is applied to a pre-existing, finished panel construct, by pressing the coating onto the panel construct, and thereby bond the coating to the surface of the panel construct. The method is used to produce enhanced panels which can be used in the production of flooring materials, wall panels, furniture, countertops, and the like. The resultant panels typically have an enhanced surface that protects the surface layer of the panel construct. The coated panel can also be made abrasion resistant, and can also be enhanced so as to provide better acoustical properties while providing a soft touch, haptic surface.

10 Claims, 2 Drawing Sheets

(51) Int. Cl.
  *B05D 5/06*    (2006.01)
  *B29C 41/00*   (2006.01)
  *B32B 27/00*   (2006.01)

(56) References Cited

U.S. PATENT DOCUMENTS

| | | |
|---|---|---|
| 2011/0073253 A1 | 3/2011 | Clausi |
| 2012/0103722 A1 | 5/2012 | Clausi |
| 2012/0276348 A1* | 11/2012 | Clausi .................. B32B 29/002 |
| | | 428/196 |
| 2014/0196982 A1 | 7/2014 | Clausi |
| 2014/0242342 A1* | 8/2014 | Vandevoorde ........ B32B 29/005 |
| | | 428/192 |
| 2017/0233953 A1* | 8/2017 | Kipphardt ............. B32B 29/002 |
| | | 427/391 |
| 2017/0321416 A1 | 11/2017 | Clausi |
| 2018/0222169 A1 | 8/2018 | Clausi |

OTHER PUBLICATIONS

Written Opinion issued in PCT/CA2018/050363, Jun. 12, 2018, pp. 1-9.

\* cited by examiner

PRESSABLE COATING SYSTEM FOR THE PRODUCTION OF PANEL PRODUCTS

FIELD OF INVENTION

The invention relates to a coated panel and to a coated panel production method. In particular, the present invention relates to an approach wherein an existing panel construct is coated with a liquid layer of a coating material, dried, and then pressed while heating in order to crosslink the coating and cause it to bond to the panel construct surface. The pressed, coated panels can be used in the production of flooring materials, wall panels, furniture, countertops, and other such finished products.

BACKGROUND OF THE INVENTION

Construction panels used in the manufacture of flooring, wall panels, furniture, countertops, and the like, are currently made in different ways. These types of panels are well known in the art, and it is these finished "panel constructs" that are of particular interest in the practice of the present invention.

In a first type of panel construct, veneers, or multi-layer glued wood veneer layers are assembled to form plywood or engineered wood panels. The wood veneer, or the multi-layer wood veneer plywood layers may be uni-directional or may have alternating adjacent layers so as to achieve better structural stability and have improved resistance to moisture.

Another type of panel construct includes composite core panels which are produced by blending wood chips, fibres, strands and/or particles together with a resin, and forming a mat of the resin coated materials. The resultant mat is then pressed under heat and pressure in order to form and then cure the panel. Examples of these types of composite core panels are boards such as particleboard, MDF (medium density fibreboard), HDF (high density fibreboard), OSB (oriented strand board), or the like.

Additional types of panel constructs are wood veneer panels which are prepared by adhering a wood veneer layer to at least one surface of a composite panel using an adhesive.

Another common type of panel construct includes laminated panels which are used in the production of flooring, furniture panels and wall panels. These types of panels typically have a multilayer structure comprised of a core panel, and multiple treated paper layers, on at least one side of the core panel. These types of laminate panels are formed by pressing the various layers under heat and pressure, in one or multiple steps, in order to form the laminate panel and bond the various layers to each other.

Commonly, in these types of laminated panels, the core panel is an MDF or HDF board, and the paper layers are typically paper sheets which have been impregnated with a suitable resin material, and then air dried. The resin impregnated paper sheets are placed over the core panel so as to provide the various layers found in a typical laminate panel, and the assembled sheets are pressed in a heated press to form the laminated panel. The paper layers used in the laminated panel can include layers such as an overlay wear layer, a decorative layer, and a balancing layer. While the exact structure and properties of these panels can vary between manufacturers, most laminate flooring panels include both a wear layer and a decorative layer on one side of the core panel, and a balancing layer on the opposite side of the core panel. However, those skilled in the art will be aware that numerous variations on the types of paper layers, and their relative positioning, are known in this field.

Commonly though, the preferably transparent, overlay paper wear layer is positioned over the decorative paper layer, in applications such as flooring, so as to act as a protective wear layer where the extra durability of the wear layer would be beneficial. This wear layer can include abrasion resistant particles, such as aluminum oxide, or the like, to provide enhanced durability of the panel surface. When covered by the transparent wear layer, the pattern printed on the paper of the decorative layer, is still visible to the user, through the wear layer.

The wear layer is commonly formed by impregnating a paper sheet with melamine resin which provides a brittle and rigid paper layer. However, the use of other resin technologies is also possible. For example, in US patent publication No. 20120103722 (incorporated herein by reference), the inventors have described the use of more flexible, elastomeric resins for impregnating one or more of the paper layers, in order to provide an elastomeric resin impregnated paper, and in particular, an elastomeric polyurethane-based resin, that provides sound attenuating properties, in the finished panel.

In any case, the decorative layer, and the optional wear layer are typically positioned on the upper surface of the core material of a laminated panel in such a manner that the decorative paper provides the laminate flooring with its individual appearance, and the wear layer provides the desired wear resistance.

After pressing of the laminated panel, the resulting finished panels usually have a realistic looking appearance since the design printed on the decorative paper layer is clearly visible.

To enhance the appearance of the laminated panels however, the upper surface of the pressed panels may frequently include an embossed texture which has been applied to the laminated panel during pressing, so as to create a more realistic textured panel surface. This is commonly done using, for example, a register embossing system in the panel press, and this technique is currently well known to those skilled in the art.

Regardless of the production technique, these types of laminated panels are a preferred type of panel construct to be used in the practice of the present invention, as hereinafter described.

Other specialty laminated panels that can also act as panel constructs include panels having a core layer to which a surface layer of a material such as cork, linoleum, pressed wood powders, PVC, or an HPL (High Pressure Laminate) material, or the like, has been bonded.

Also, panel constructs can be produced wherein the panel construct is produced by simply printing a pattern directly on to the upper surface of a core panel.

Additionally, other types of panel constructs that might be used in this art include panels having a core material comprised of one or more layers of a plastic material. This includes panels having a core layer made of, for example, polyvinyl chloride (PVC), or the like. This includes products such as luxury vinyl tiles (LVT), vinyl planks, and the like.

Additional panel constructs can be prepared using panels having a composite core layer which includes panels having a core of one or more layers of paper or a plastic material, combined with various fillers, and the like. This approach includes panels such as linoleum, WPC (wood plastic composites) panels, and other such products. In these products, a paper or plastic core layer is provided, and printed plastic decorative films are commonly included during pressing, on the top and/or bottom of the core layer, in order to provide the desired appearance or to provide some structural benefit. Once again, during pressing, texture may be provided to the panel in order to provide a more realistic textured panel, tile or plank.

The panel constructs can also be solid wood planks or boards, metal panels, glass panels, ceramic or porcelain panels, plastic panels, and the like.

Using all of these techniques, large volumes of panel products are commercially produced and used extensively in the flooring, furniture, and panel construction industries. However, frequently, it is desired to enhance the appearance of these panel constructs, and/or to enhance the properties of these panels, such as, for example, to improve their sound attenuating properties, provide a softer-feeling panel, provide improved resistance to wear or photodegradation, provide improved washability, provide better impact and/or scratch resistance, or the like. However, coating of these materials onto a finished panel construct, is not always easily achieved.

In some instances, the upper and/or lower layers on the exterior surfaces of the panel may be finished with a liquid coating, such as a stain, varnish, paint or other surface treatment material, to add color or a suitable finish, to the wood. These are usually air-dried, but low temperature heating (e.g. less than 50° C.) might also be used. UV cured coating layers might also be added to the panel exterior to protect the panel from exposure to the elements.

Preferably, a curable coating is used, wherein the coating material includes a polymerizable material, which is polymerization by drying, heating, UV radiation, or the like, in order to form a network of interbonded molecules.

However, application of liquid coatings to the finished panel constructs is typically complicated and requires a finishing line. Depending upon the type of substrate that needs to be coated, the finishing line may include many processing steps including, sanding, application of a sealing coat, curing of said sealing coat, sanding the sealed surface, application of a stain, curing of the stain, brushing the stained surface to smooth the surface, and subsequently applying up to 10 separate UV curable coatings.

This coating operation is therefore excessively complex, and additionally, it is known in the art, that UV coating conditions, can lead to degradation of the underlying, substrate panels.

Thus, while a wide variety of materials and techniques are currently known for coating finished panel constructs, it would be beneficial and advantageous to this industry to provide an alternative approach for creating improved, enhanced or altered coated panel constructs that have improved, enhanced or altered appearance, feel, sound attenuating properties, texture, and/or wear capabilities. As such, it would be advantageous and beneficial to the industry to provide an alternative method for coating these prior art panel constructs in order to provide coating panel constructs having improved, enhanced or altered properties.

SUMMARY OF THE INVENTION

Accordingly, the present invention provides a coated panel, wherein the coated panel has improved, enhanced or altered appearance, texture, and/or wear capabilities, when compared to traditional finished panel constructs.

The present invention also includes a coated panel having a softer, and preferably, haptic feel, and which also provides improved sound attenuating properties over prior art panel constructs.

The present invention additionally includes a method for the production of coated panels having improved or enhanced appearance, feel, sound attenuating properties, texture, and/or wear capabilities, when compared to traditional panel product constructs. The advantages set out hereinabove, as well as other objects and goals inherent thereto, are at least partially or fully provided by the coated panel, and the coated panel production process of the present invention, as set out herein below.

Accordingly, in a first aspect, the present invention includes a process for the production of a coated panel comprising applying one or more layers of a preferably liquid coating material to a surface of a panel construct, preferably with drying of each of said layers of coating material after each coating layer application, so as to produce a coated panel construct, and subsequently pressing the coated panel construct under conditions of heat and pressure, for sufficient time to cure and crosslink said coating material, and bond said coating material to the surface of the panel construct.

The coated panel can be used, as is, or cut to a desired size, in order to produce the desired size of panel products. The coated panel can be used, as is, or it can be subsequently affixed to another panel or panel construct, using, for example, a glue or other adhesive.

Preferably, the coating material to be used in the practice of the present invention, is an elastomeric resin-based material, and most preferably, is a solution or dispersion of an elastomeric resin in water or in another suitable solvent. More preferably, the coating material is a water-borne solution or dispersion of an elastomeric resin, and in particular, is a water-borne solution or dispersion of an elastomeric polyurethane-based resin. Further, while the coating material can be opaque or translucent, tinted or coloured, preferably, the coating material used is one which provides a clear, colourless, transparent coating on the surface of the panel construct. Accordingly, the coating material is most preferably an aqueous, elastomeric polyurethane-based resin solution or dispersion, which dries and cures to a clear, colourless, transparent coating.

In use, the top, or upper surface of the pre-existing panel construct is the surface typically coated, and this can be achieved using any suitable coating technique such as spray coating, roller coating, curtain coating, knife coating, vacuum coating, dip coating, or the like.

While a single coating layer might be applied and used, typically, a plurality of layers of the coating material are used. When multiple layers of the coating material are used, the layers of the coating material are preferably allowed to dry between layers, by air-drying each of the coated layers at ambient temperature, or by drying each of the coating layers in an oven at a relatively lower temperature, for a short time period, in order to avoid or minimize any curing or crosslinking of the applied coating material during the drying stage.

Using this approach, once the first applied coating layer is dried, additional layers of coating material can be applied to the previous coating layer, with drying of the coating after the application of each coating layer. This process can be repeated until the desired thickness, or amount, of applied coating material has been achieved.

Once coated and preferably dried onto the surface of the panel construct, in accordance with the present invention, the coated panel construct can be placed into a press and pressed under heat and/or pressure in order to effect crosslinking and curing of the coating material, and thereby bond said coating material to the surface of the panel construct.

By using this technique, a further coating layer is affixed to the surface of the finished panel construct so as to provide improved, enhanced or altered appearance and/or performance properties.

Thus, in accordance with the present invention, in a first stage of one preferred embodiment of the method of the present invention, a water-based elastomeric coating system is applied to the surface of a panel construct by means of a roll-coater, spray coater, curtain coater, knife coater, vacuum coater, dip coater, or the like. The liquid coating on the panel surface is dried to remove the water and leave only a deposit film of elastomeric solids. Multiple coating and drying steps are used as necessary in order to apply a desired film build of elastomeric solids on the panel construct.

In a second stage of this embodiment, the dried coated panel construct is placed in a hot press and pressed. The heat and pressure from the press causes the elastomeric resin solids to flow over the surface of the panel construct where they crosslink, cure and bond with the substrate of the panel construct. This process thus creates the coated panel of a preferred embodiment.

After pressing, the resultant pressed, coated panel is removed from the press and cooled. After cooling, the panel may be used as is, or cut into flooring tiles or planks which may be further machined where necessary or desired, so as to include a suitable joining system or the like.

Additionally, it should be noted that during pressing, the heated press may include either a smooth press plate, or a textured press plate, and the smooth or textured surface of the plate will be transferred to the surface of the coated panel. The texture applied by the press, may be any suitable or desired pattern including a wood grain pattern, a geometric pattern, or the like, or even a flat or piano-finish, as is know in the art. The texture plate may also be designed to emboss the panel surface with any suitable or desired embossing pattern. Moreover, the texture applied may be opposite, complimentary, in alignment with, or "in register" (as is known in the art), with an underlying image or surface of the underlying panel or a portion or segment thereof.

Generally, the gloss level of the finished panel can also depend upon the surface of the press plate. Flattening agents might also be added to the composition to reduce the gloss level. Optionally, a suitable release paper may be used to provide the coated panel with the desired texture or gloss, and this may be achieved by placing the release paper over the coated surface of the coated panel construct prior to pressing.

The panels produced by this process are also of interest, and thus, the present invention is therefore also directed to the resultant coated panels produced by this process. As such, in a further aspect, the present invention also includes a coated panel wherein the coated panel comprises a panel construct which panel construct has been coated on at least one surface, with a layer of a cured and crosslinked coating material, and wherein said coating material is bonded to the surface of said panel construct by pressing said coated panel construct, under heat and pressure, in order to form the coated panel.

Preferably, the coating material is the same coating material described hereinabove with reference to the present invention, and most preferably, is an elastomeric polyurethane coating. Again, as previously described, while the coating may be applied in one layer, preferably, it is applied as a plurality of layers.

DETAILED DESCRIPTION OF THE INVENTION

The panel construct to be used in the production of a coated panel, and in the manner described in the present invention, can be any generally known material useable as a panel product. This includes all of the panel products listed hereinabove as panel constructs, but in particular, includes panels such as particleboard, MDF (medium density fibreboard) board, HDF (high density fibreboard) board, OSB (oriented strand board), a multi-layer glued wood veneer applied to plywood or engineered wood panels or applied to the surface of a composite panel, laminated panels for use in the production of flooring, furniture panels and wall panels, panels having a core layer to which a surface layer of a material such as cork, linoleum, pressed wood powders, an HPL (high pressure laminate) or DL (direct laminate) material, or a PVC based panel, a panel produced by direct printing of a pattern directly on to the upper surface of another panel, a panel construct based on panels having a core material comprised of one or more layers of a plastic material, a luxury vinyl tile (LVT), a vinyl plank, or a WPC (wood plastic composites) panel.

In one particularly preferred exemplary implementation of the process of the present invention, a laminated panel, and more preferably, a laminated flooring panel is preferably selected as the panel construct. In general, preferred laminated panels are of the type having an HDF or MDF core layer covered on one side by a resin-impregnated paper decorative layer, and optionally, a resin-impregnated paper overlay wear layer. On the other side of the core layer, a resin-impregnated paper backing or balancing layer is provided for structural stability. During production of the panel construct, the assembled layers of the laminated panel are pressed under heat and pressure to form the laminated panel, and it is this type of panel which is of particular interest, as the panel construct, in the practice of the present invention.

While other panel constructs might be used, for brevity, the invention will be hereinafter described with respect to the use of a laminated panel, as the panel construct, unless otherwise noted. As such, it is understood that the panel construct (described as preferably being HDF or MDF) can be substituted with any panel construct as described herein.

Starting with this panel construct, the laminated panel is subsequently coated with a coating material, and then pressed in a suitable press to create the coated panel of the present invention.

The preferred coating material used in the practice of the present invention can be any suitable elastomeric coating material. This coating material is typically based on the use of a suitable elastomeric resin system. Suitable elastomeric resin systems can include elastomeric resin materials based on plastic-based materials, modified melamine-based materials, acrylic-based resins, polyurethane-based resins, or the like, or mixtures thereof, but most preferably, the coating material is a coating based on the use of a polyurethane-based resin. As used herein, the term "based on" means, utilizing or including, as a substantial or majority component (preferably at least about 25%, more preferably at least about 40%, even more preferably greater than 50%, and most preferably greater than about 60%), such as by weight or by volume.

The coating material applied to the panel construct is preferably a liquid material which can be supplied as a water-borne or solvent borne solution, latex, emulsion or dispersion, which is sprayed onto, or spread over the top of the panel construct, using for example, a spray coater, roll coater, knife coater, curtain coater, vacuum coater, dip coater, or any other system for applying such liquid material, or the like. Numerous coats of the coating material can be applied, and when more than one coat is applied, preferably, the applied layers of the coating material are dried between coats. Preferably the coating layer is dried by air drying, hot air drying, radiant heat drying, or a combination thereof. In this drying operation, the coating material is dried in a manner so that a majority of, or most preferably essentially all of, the solvent or moisture present in the coating system, is removed. When heat is used for drying, in an oven or drying tunnel, the drying stage is preferably conducted at temperatures of less than 130° C., more preferably at temperatures of less than 90° C., and most preferably, at temperatures of less than 60° C., as avoiding or minimizing curing of the applied resin material is typically preferred. When curing of the applied resin material is desired, other drying conditions may be used. In some embodiments (although less preferred), it is desirable to cure, or at least partially cure the applied resin material, and, as such, different drying conditions may be used. Combinations of drying conditions can be used, but drying is typically accomplished over a short time period of, for example, between 30 seconds and 5 minutes, for each layer, but this length of time can vary depending on the conditions (e.g. temperature, humidity etc.) encountered during the drying operation, as well as the desired properties of the particular layer and combinations of layers. Using this drying technique between the application of the coating layers, the coated panel surface can be re-coated and dried in order to build up a film of sufficient thickness to provide sufficient film build (when dried and cured) in order to adequately coat and protect the panel construct.

Preferably, the resin system used for the coating material is a semi-flexible or flexible elastomeric resin system, and most preferably, is a semi-flexible or flexible polyurethane-based elastomeric resin system. These types of resin systems typically have superior adhesion properties, and can provide generally superior impact properties when compared to other resin systems.

The elastomeric resins of interest in the production of the coating materials used in the present invention preferably comprise natural and/or synthetic resins, or combinations thereof, having elastomeric properties. This includes one component or multi-component; thermoset, or thermoplastic (for example, a TPE—thermoplastic elastomer), solution polymer or water-based or solvent-based suspensions, dispersions and latexes. Either block or alternating or random copolymers may be used. The said material can be based on, but not limited to the following polymers, namely: Polyurethane, polyethylene or polypropylene-based resins; Ethylene vinyl acetate; Ethylene vinyl alcohol; Polyesters; Polyolefin (including TPO—thermoplastic olefin); modified Melamine-based thermoset resins; Urea and Urea modified resins; ESI (ethylene styrene interpolymer), or any of the styrene acrylic copolymers and Acrylic resins; rubber based materials such as NBR (nitrile Butadiene), SBR (styrene butadiene), CR (chloroprene), silicone, fluorocarbon, acrylamide, epichlorohydrin, and/or carboxylated, natural and synthetic latexes; or combinations thereof.

The elastomeric resin can be made from any of the above materials, and used in any suitable liquid form suitable for coating the panel construct. Most preferably, the coating material is based on an elastomeric polyurethane resin which resin is preferably provided as a water-borne solution or dispersion of the polyurethane resin. Thus, preferably, the elastomeric resin is a water-based, polyurethane resin, and in particular, a water based, UV-resistant, aliphatic polyurethane resin.

After coating, the coated and dried panel is typically placed in a press, and then pressed under heat, in order to finally and fully cure and crosslink the coating, and also bond the coating material to the panel construct.

The thickness of the elastomeric coating material to be applied to the panel construct is preferably from 1 micron to 5 mm, more preferably from 50 microns to 3 mm, and still more preferably between 100 microns to 1.5 mm. However, thinner or thicker coatings might also be used.

The weight of the applied and dried elastomeric coating is preferably between 3 to 150 grams per square meter, and more preferably between 5 and 100 grams per square meter. Still more preferably, the weight of the applied and dried elastomeric coating is between 40 and 80 grams per square meter.

It should also be noted that the application of the elastomeric coating material shall not be limited to the coating of the upper surface of the panel construct, and coating of the bottom surface of the panel construct is not excluded in the practice of the present invention.

Preferably, the elastomeric material is in the form of a water-based dispersion or a water-based or solvent-based solution polymer. The elastomeric material, when cured, preferably has defined limits of elongation of 0-2000%, a 100% modulus between 0-1500 psi, and a tensile strength between 0-5000 psi, in accordance with ASTM D-412.

The panel construct can have a smooth or textured surface prior to the application of the coating material of the present invention. In the first stage, the coating material is applied to the desired panel construct surface and dried to remove any moisture or volatiles present in the liquid coating. In the second stage, the coated panel construct is pressed under heat and pressure to produce a smooth coating, or it can be pressed to produce a textured surface or embossed surface, in a technique as described above. However, the textured or embossed surface applied to the coating material can have a deeper texture or appearance, due to the possibility of having a thicker coating material layer.

Depending on the nature of the panel construct, and the nature of the resin components of the coating material, the coated panel construct is preferably pressed at pressures of between 5 to 90 kg/cm$^2$, more preferably 10 to 80 kg/cm$^2$, and still more preferably at pressures of between 20 and 60 kg/cm$^2$. During pressing, the pressed panel is preferably heated at temperatures of between 50° C. and 250° C., more preferably between 100° C. and 220° C., and still more preferably, between 110° C. and 150° C., for a sufficient time to allow the resin to cure, crosslink, and bond to the panel construct.

Typically, this time period in the heated press, is less than 5 minutes, more preferably, less than 1 minute, and still more preferably, less than 30 seconds. Most preferably, the coated panel is in the heated press for less than 15 seconds.

These conditions are typical of batch operations. Conditions in, for example, the heated calendaring roller of a continuous pressing operation will be similar to these temperatures and pressures, in order to effectively cure, crosslink and bond the coating material to the surface of the panel construct.

Other materials can also be included in the formulations of the present invention. For example, coupling agents, including silane compounds such as silane titanates, may also be included. Preferably, less than 1%, based on solids of the weight of the resin formulation, and more preferably, less than 0.5%, of these agents, are used.

Other materials which might be added include surfactants or other surface modifying agents. Preferred surfactants include non-ionic surfactants, and preferably silicone-based surfactants including, for example, polysiloxane-polyoxyalkylene copolymers, and the like. The total amount of surfactants present is preferably between 0.1 and 10%, of solids, by weight of the resin formulation, and more preferably, between 1 and 6%, by weight. Most preferably, the weight of the surfactant is between 2 and 4% by weight of the resin formulation.

The coating material used may also contain wear particles including ceramic particles, corundum or other aluminum oxide particles, or the like. Preferably, the particles are between 50 and 300 microns in size and are transparent after the pressing operation. This forms an abrasion resistant, coated panel. Thus, in one preferred approach, the elastomeric coating material includes abrasion resistant materials to enhance the durability of the re-coated layer, and thus act to provide an enhanced wear layer. Preferred abrasion resistant materials include aluminum oxides, such as corundum, ceramic particles, or the like. Any suitable amount of abrasion resistant particles can be used. However, typically, the preferred amount of abrasion resistant particles is such, so as to provide between 2 to 20 grams of particles per square meter, and more preferably between 3 to 12 grams per square meter. Moreover, depending upon the desired properties of the final product, particles of differing sizes may be used to add, e.g., scratch resistance, to the wear resistance.

A reaction catalyst or cross-linking agent can also be preferably added to the system, and preferably, these material used in this function is an amine based material, including, for example, primary, secondary or tertiary amines, or combinations thereof. The catalysts can also be metallic based materials, including, for example, tin, lead, or bismuth based catalysts, or the like. Suitable amine catalysts and crosslinking agents include, for example, triethylenediamine, N-methylmorpholine, tetramethyl-2,4-butanediamine, N-methylpiperazine, dimethylthanolamine, triethylamine, and the like, and organometallic compounds, such as stannous octanoate, dibutyltin dilaurate, dibutyltin di-2-ethylhexanoate, and the like. The catalysts and crosslinking agents may be used alone or in combination with one another. The amount of catalyst or crosslinking agent typically ranges from 0.03 to 5.0 parts by weight on solids, and preferably between 0.1 to 3 parts by weight of solids, based on the total weight of the resin.

Release agents to aid in releasing the panel from the press, might also be included in the formulation. These can include silicone-based products, but more preferably, silicon-free agents including materials such as waxes, fluorine-based chemicals, polyvinyl alcohol based materials, and the like, are used. These materials are typically used at levels of between 0.1 and 5.0 parts, and more preferably, at levels of between 0.5 and 2 parts, by weight of solids based on the total weight of the resin.

Where other properties are desired, additional additives may be added to the composition including colorants, stains, dry or liquid inks or pigments, fire and flame retardants, smoke suppressants, internal mold release additives, blocking agents, UV protectants, anti-bacterial agents, anti-microbial agents, oliophobic materials, antistatic agents, flattening agents, and such other additives as required or desired.

BRIEF DESCRIPTION OF THE DRAWINGS

Embodiments of this invention will now be described by way of example only in association with the accompanying drawings in which.

DETAILED DESCRIPTION OF THE PREFERRED EMBODIMENTS

Figure 1:
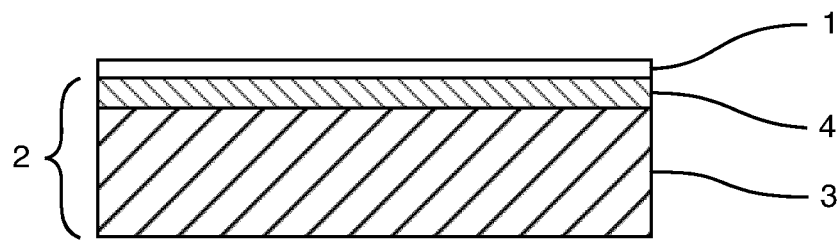
FIG. 1 is a side view of a wood veneer panel with a coating of elastomeric film in accordance with the present invention.

The novel features which are believed to be characteristic of the present invention, as to its structure, organization, use and method of operation, together with further objectives and advantages thereof, will be better understood from the following examples and figures in which a presently preferred embodiment of the invention will now be illustrated by way of example only. In the figures, like reference numerals depict like elements.

It is expressly understood, however, that the figures are for the purpose of illustration and description only and are not intended as a definition of the limits of the invention.

Also, unless otherwise specifically noted, all of the exemplified features described herein may be combined with any of the above aspects, in any combination. Also, it should be understood that the drawings are not to scale.

EXAMPLES

The examples described hereinbelow make reference to the drawings provided in FIGS. 1 to 6, and as such, reference numbers related to the figures are provided in each example.

Example 1

Referring to FIG. 1, a coating (1) comprising 125 g of WB420, available from Purchem Systems Inc., as a water-based elastomeric aliphatic polyurethane, and having a solids content of 40%, was mixed with 7 g of WB475 (Purchem) of a 60% solids, water based amine crosslinking agent, and 4 g of AD-200R (Purchem) as a 55% solids, aqueous fluoro-based release agent. This mixture was applied to a panel construct (2) by spraying the mixture onto the panel construct (2), using a spray coater.

In this example, panel construct (2) consisted of a thin wood veneer surface (4) glued to an HDF core panel (3). After a first coat, the coated panel was dried in a lab oven at 80° C. for 3 minutes to remove moisture. When dried, the coated panel was re-coated with the same coating material, and again dried in a lab oven at 80° C. for 3 minutes to remove moisture. This process of coating and drying was repeated until the coating on the panel surface reached the desired weight of 30 grams per $m^2$.

The resultant dried coated panel, as shown in FIG. 1, was placed in a heated press with a surface temperature of 120° C. for both the upper and lower press plates. The upper press plate included a wood-grain embossing texture. The press pressure was 20 kg/$cm^2$ and the press time was 20 seconds.

After the press cycle was completed, the hot panel was removed from the press and allowed to cool.

A fully elastomeric coated, textured, laminated wood veneer panel with a soft elastomeric upper surface coating and excellent transparency was produced.

Example 2

Figure 2:
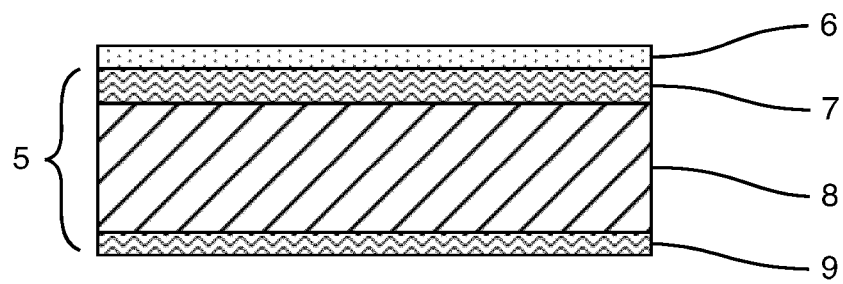
FIG. 2 is a side view of a cork veneer panel with a backing layer, and having a coating of elastomeric film incorporating corundum.

With respect to FIG. 2, a coating (6) comprising a mixture of 100 g of WB420 (available from Purchem Systems Inc.), as a water-based elastomeric aliphatic polyurethane, and 25 g of WB-100 (Purchem) as a second, more elastic, water-based aliphatic polyurethane, with both polyurethanes having a solids content of 40% by weight, 7 g of WB475 (Purchem) of a 60% solids, water-based amine crosslinking agent, 4 g of AD-200R (Purchem) as a 55% solids, aqueous fluoro-based release agent, and 10 parts by weight of corundum particles, was applied to a panel construct (5), by use of a roller coater. Panel construct (5) included a cork veneer surface (7) bonded to an MDF core panel (8) and had a cork veneer backer layer (9). The coated panel was dried in a lab oven at 80° C. for 3 minutes to remove moisture. The coated panel was then re-repeatedly coated and dried in a lab oven at 80° C. for 3 minutes to remove moisture, until the coating on the panel surface reached the desired weight of 15 grams per $m^2$.

The dried coated panel as shown in FIG. 2 was placed in a heated press with a surface temperature of 120° C. for both the upper and lower press plates. The upper press plate included a smooth low gloss surface structure. The press pressure was 7 kg/cm² and the press time was 45 seconds.

After the press cycle was completed, the hot panel was removed from the press and placed in a cooling press to allow the panel temperature to cool down to 26° C. The cooling press pressure was also set at 7 kg/cm² and the press time was 60 seconds.

As a result, a fully elastomeric coated, textured, laminated cork panel with a soft elastomeric upper surface coating with excellent abrasion resistance and excellent transparency was produced.

Example 3

Figure 3:
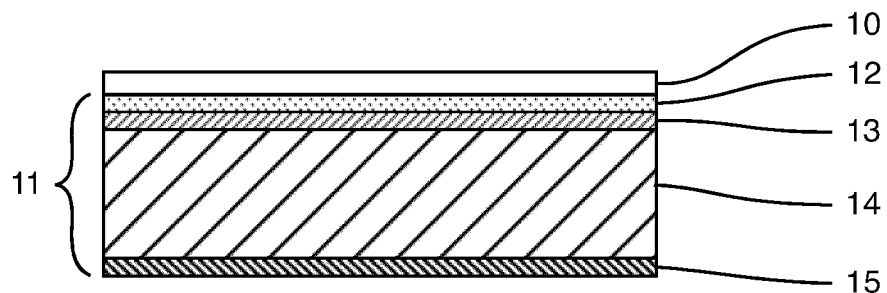
FIG. 3 is a side view of a laminate floor panel with a coating of elastomeric film.

With respect to FIG. 3, a coating (10) comprising the same resin formulation as described in Example 1, was applied by spraying the coating material onto a previously pressed and cured, laminate floor panel (11) as a panel construct, using a spray coater. Floor panel (11) included a melamine overlay layer (with corundum) (12); a melamine treated decor paper (13), a particleboard core (14) and a melamine backer layer (15). After coating, the coated panel was dried in a lab oven at 80° C. for 3 minutes to remove moisture. The coated panel was then repeatedly re-coated and dried in a lab oven at 80° C. for 3 minutes to remove moisture, until the coating on the panel surface reached the desired weight of 20 grams per $m^2$.

The dried coated panel was placed in a heated press with a surface temperature of 100° C. for both the upper and lower press plates. The upper press plate included a wood-grain texture. The press pressure was 45 kg/cm² and the press time was 12 seconds. After the press cycle was completed, the hot laminate floor panel was removed from the press and allowed to cool.

A fully elastomeric coated, textured, laminate floor panel with a soft elastomeric upper surface coating and excellent transparency was produced.

Example 4

Figure 4:
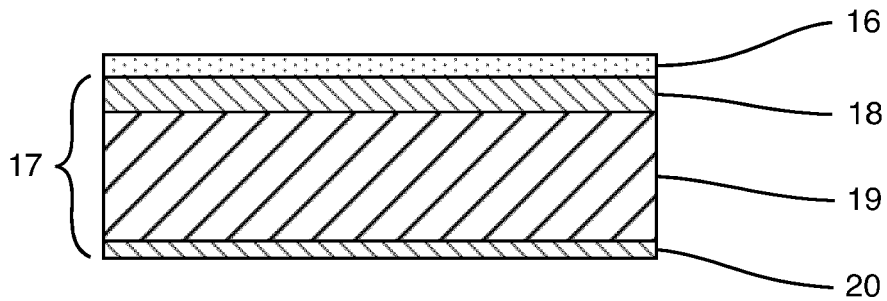
FIG. 4 is a side view of a wood veneer panel with a backing layer, and having a coating of elastomeric film incorporating corundum.

In respect of FIG. 4, a coating (16) having the same formulation as the coating used in Example 2, was applied by use of a curtain coater, to an engineered flooring panel (17). Engineered flooring panel (17) consisted of an upper decorative wood veneer surface (18) bonded to an HDF panel (19) and a wood veneer balancing layer (20) bonded to the underside. The coated panel was dried in a lab oven at 80° C. for 3 minutes to remove moisture. The coated panel was then re-coated and dried in a lab oven at 80° C. for 3 minutes to remove moisture so that the coating applied reached the desired weight of 20 grams per $m^2$.

The dried coated panel was placed in a heated press with a surface temperature of 120° C. for both the upper and lower press plates. The upper press plate included a wood-grain texture. The press pressure was 20 kg/cm² and the press time was 20 seconds. After the press cycle was completed, the hot panel was removed from the press and allowed to cool.

A fully elastomeric coated, textured, laminated abrasion resistant wood veneer panel with a soft elastomeric upper surface coating and excellent transparency was produced.

Example 5

Figure 5:
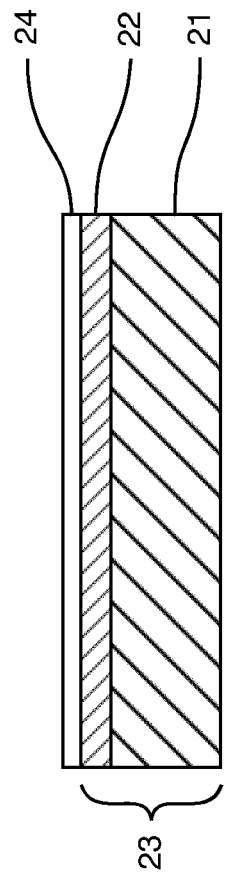
FIG. 5 is a side view of an extruded PVC-based plastic panel, and having a coating of elastomeric film.

In respect of FIG. 5, a coating (24) comprising 100 g of ENCOR 2173, available from Arkema, as a water-based acrylic, and having a solids content of 40%, was mixed with 5 g of WB475 (Purchem) of a 60% solids, water based amine crosslinking agent, and 3.5 g of AD-200R (Purchem) as a 55% solids, aqueous fluoro-based release agent. This mixture was applied using a spray coater, to a WPC panel (23), as the panel construct, having a rigid PVC core (21) and a decorative vinyl veneer overlay layer (22). The coated panel was dried in a lab oven at 70° C. for 3 minutes to remove moisture. Only a single coat of coating material was required to reach the desired weight of 15 grams per $m^2$.

The dried coated panel was placed in a heated press with a surface temperature of 140° C. for both the upper and lower press plates. The upper press plate includes a smooth surface structure with no embossing. The press pressure was 20 kg/cm² and the press time was 15 seconds. After the press cycle was completed, the hot panel was removed from the press and allowed to cool.

A fully elastomeric coated, smooth WPC panel with a soft elastomeric acrylic surface coating having excellent transparency was produced.

Example 6

Figure 6:
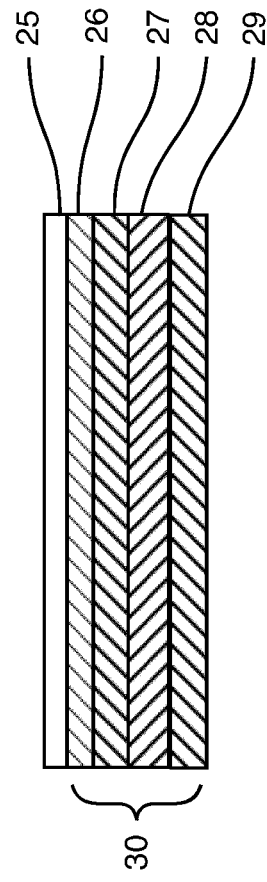
FIG. 6 is a side view of an HPL panel, having a coating of elastomeric film.

With respect to FIG. 6, a coating (25), comprising the same resin formulation as described in Example 1, was applied by spraying the coating material onto a previously pressed and cured, HPL panel (30), as a panel construct. HPL panel (30) included a melamine impregnated décor layer (26), and three layers of phenolic-treated kraft paper layers (27, 28 and 29). After the first coat of coating material, the coated HPL panel was dried in a lab oven at 80° C. for 3 minutes to remove moisture. The coated panel was then repeatedly re-coated and dried in a lab oven at 80° C. for 3 minutes to remove moisture, until the coating on the panel surface reached the desired weight of 20 grams per $m^2$.

The dried coated HPL panel was placed in a heated press with a surface temperature of 100° C. for both the upper and lower press plates. The upper press plate included a wood-grain texture. The press pressure was 45 kg/cm² and the press time was 30 seconds. After the press cycle was completed, the hot laminate floor panel was removed from the press and allowed to cool.

A fully elastomeric coated, textured, HPL panel with a soft elastomeric upper surface coating and excellent transparency was produced.

Thus, it is apparent that there has been provided, in accordance with the present invention, a process for producing a coated panel construct which fully satisfies the goals, objects, and advantages set forth hereinbefore. Therefore, having described specific embodiments of the present invention, it will be understood that alternatives, modifications and variations thereof may be suggested to those skilled in the art, and that it is intended that the present specification embrace all such alternatives, modifications and variations as fall within the scope of the appended claims.

Unless otherwise specifically noted, all of the features described herein may be combined with any of the above aspects, in any combination.

Additionally, for clarity and unless otherwise stated, the word "comprises" and variations of the word such as "comprising" and "comprises", when used in the description and claims of the present specification, is not intended to exclude other additives, components, integers or steps. It will also be understood that the term "comprising", or the like, can be replaced by the phrase "consisting of" or by the phrase "consisting essentially of" so that the claims can be limited to the exact formulations described in the description or claims, without additional materials being present.

Moreover, the words "substantially" or "essentially", when used with an adjective or adverb is intended to enhance the scope of the particular characteristic; e.g., substantially planar is intended to mean planar, nearly planar and/or exhibiting characteristics associated with a planar element.

Further, use of the terms "he", "him", or "his", is not intended to be specifically directed to persons of the masculine gender, and could easily be read as "she", "her", or "hers", respectively.

Also, while this discussion has addressed prior art known to the inventor, it is not an admission that all art discussed is citable against the present application.

We claim:

1. A coated panel selected from floor panel, wall panel and furniture panel and comprising one or more layers of a coating material applied to the surface of a panel construct, the coating material defining the surface of the coated panel, wherein said coating material is a solution polymer or dispersion of an elastomeric resin-based material in water or another solvent, wherein the water or other solvent present in the coating material is substantially removed by a drying process such that a layer of the elastomeric resin-based material remains on the surface of the panel construct, and wherein said layer of coating material has been bonded to the surface of said panel construct by use of a pressing and heating operation, subsequent to the drying process, such that the layer of the elastomeric resin-based material are cured and crosslinked, and bond said coating material to a surface of said panel construct, and wherein said coating material is based on thermoplastic resin comprising polyurethane and/or Acrylic resins, wherein the layer of the elastomeric resin-based material has a weight between 3 to 150 grams per square meter.

2. The coated panel as claimed in claim 1, wherein said coating material is an elastomeric polyurethane coating.

3. The coated panel as claimed in claim 1, wherein said coating material contains wear particles selected from ceramic particles, and corundum or other aluminum oxide particles, and wherein said wear particles are between 50 and 300 microns in size and are transparent after the pressing operation.

4. The coated panel as claimed in claim 1, wherein said panel construct is particleboard, MDF (medium density fibreboard) board, HDF (high density fibreboard) board, OSB (oriented strand board), a multi-layer glued wood veneer applied to plywood or engineered wood panels or applied to the surface of a composite panel, laminated panels for use in the production of flooring, furniture panels and wall panels, panels having a core layer to which a surface layer of cork has been applied, linoleum, pressed wood powders, an HPL (high pressure laminate) material, or a PVC based panel, a panel produced by direct printing of a pattern directly on to the upper surface of the panel, a panel construct based on panels having a core material comprised of one of more layers of a plastic material, a luxury vinyl tile (LVT), a vinyl plank, or a WPC (wood plastic composites) panel.

5. A coated panel as claimed in claim 1, wherein the elastomeric material has a thickness of from 1 micron to 3 mm.

6. A coated panel as claimed in claim 5, wherein said elastomeric material has defined limits of elongation of 0-2000%, a 100% modulus between 0-1500 psi, and a tensile strength between 0-5000 psi by ASTM D-412.

7. The coated panel as claimed in claim 1, wherein the thermoplastic resin further comprises polyethylene or polypropylene-based resins; Ethylene vinyl acetate; Ethylene vinyl alcohol; Polyesters, Polyolefin, modified Melamine-based thermoset resins; ESI (ethylene styrene interpolymer), or any of the styrene acrylic copolymers; rubber based materials selected from NBR (nitrile Butadiene), SBR (styrene butadiene), and CR (chloroprene), silicone, fluorocarbon, acrylamide, epichlorohydrin, and/or carboxylated.

8. The coated panel as claimed in claim 1, wherein the layer of the elastomeric resin-based material has a weight between 5 to 100 grams per square meter.

9. The coated panel as claimed in claim 1, wherein the layer of the elastomeric resin-based material has a weight between 40 to 80 grams per square meter.

10. The coated panel as claimed in claim 1, wherein the layer of the elastomeric resin-based material has an elongation limit of 0-2000%, a 100% modulus between 0-1500 psi, and/or a tensile strength between 0-5000 psi when cured.

* * * * *